Jan. 9, 1934.  V. C. DE YBARRONDO  1,942,748
METHOD AND APPARATUS FOR PROJECTING TWO OR MORE
ACTIONS OR SCENES AT THE SAME TIME
Filed Dec. 13, 1929
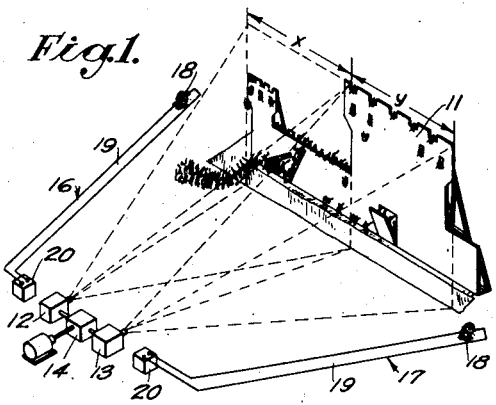
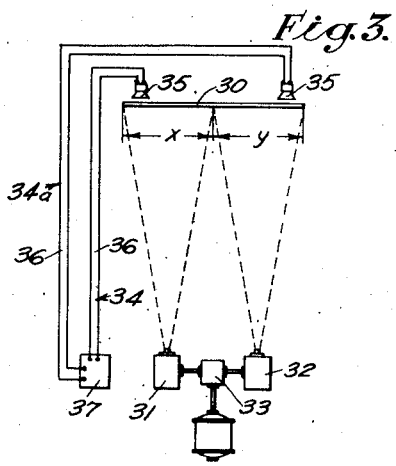
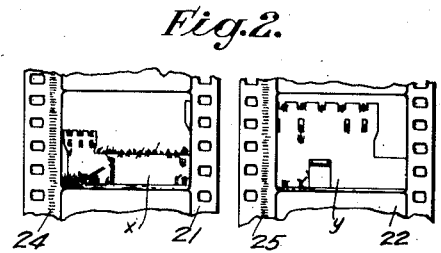
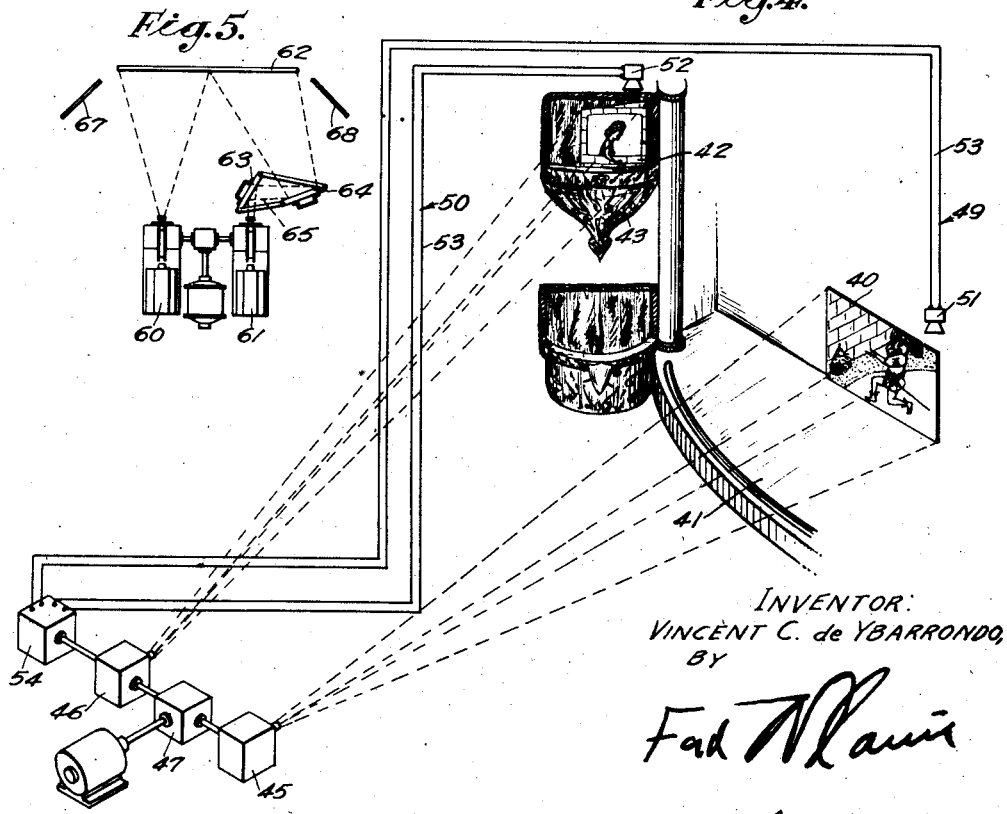
INVENTOR:
VINCENT C. de YBARRONDO,
BY
ATTORNEY.

Patented Jan. 9, 1934

1,942,748

UNITED STATES PATENT OFFICE 1,942,748

METHOD AND APPARATUS FOR PROJECTING TWO OR MORE ACTIONS OR SCENES AT THE SAME TIME

Vincent C. de Ybarrondo, Los Angeles, Calif., assignor to Patco, Inc., Los Angeles, Calif., a corporation of California Application December 13, 1929
Serial No. 413,833

6 Claims. (Cl. 88—16.2)

My invention relates to the motion-picture industry; and it relates more particularly to a method and apparatus whereby the scene or action is recorded on two or more separate films, and synchronously projected onto a screen or plurality of screens along with correlated sound, when sound is used in conjunction with sight.

According to standard practice the scenes are photographed on frames of the film, which frames are one inch wide and three-quarters of an inch high; and they are projected onto a screen of the same proportions, the screen usually being about twenty feet wide and fifteen feet high. In photographing large scenes the camera must be placed quite a distance from the scene so that the full expanse thereof may be photographed. Because of the intervening distance between the camera and the scene many important details are sacrificed, due to the inability of the camera to record these details. When the scene is projected onto a screen it appears to be in the distance and the characters and stationary objects of the scene are comparatively small. This makes it desirable and in most instances necessary to take fragmentary close-ups which are not fully satisfactory, due to the interruption to the continuity, but these methods are probably the best to be had with standard equipment.

One of the important objects of my invention is to provide a method and apparatus by means of which the scenes may be photographed and projected on a scale considerably larger than may be done with the present standard equipment. This object of my invention is accomplished by photographing the scene upon a plurality of film which may be of standard size, a portion of the scene being photographed on each film. This makes it possible to photograph the scene a distance from it inversely proportionate to the number of films used. If two films are used the camera or cameras may be placed one-half the usual distance from the scene; or if three films are used, the cameras may be placed one-third the usual distance from the scene. In projecting the scene upon the screen the portions of it recorded on the different films are properly projected in juxtaposition on the screen so that a complete and unitary picture or sight record is obtained. The size of the projected scene is larger than standard screen size in the multiple of the number of films used. If the scene is photographed on two films the projected picture will be twice normal size.

It is usual practice in talking pictures to have a single sound record which is synchronized with the sight record. In my invention I provide separate sound records of the sounds occurring at different parts of the scene. In reproducing the scenes the speaker apparatus for the separate sound records is arranged so that the sound is reproduced adjacent to that portion of the sight reproduction which corresponds to the object which originally created the sound and appears to be creating the sound in the sight reproduction. This arrangement is particularly valuable on large scenes, because sounds will appear to originate in the objects which appear to be making the sounds in the sight reproduction.

The separate films which for the sake of representing the invention we shall consider as being two in number, may represent portions of the same scene, and the sound records may be a part of the same scene. My invention also comprehends the making of two films or two sound and sight records which may be of separate scenes which form a part of the same action or continuity. By "action" or "continuity" I mean two separate records which may be reproduced synchronously and are related to each other to form a part of the same theme or story and which are necessary to form a complete sight or sound reproduction.

In recording the action involving separate scenes the two records (each of which may include either or both sound and sight records) may be made simultaneously or they may be made at different times and later conditioned for synchronism.

In reproduction two records must be synchronized. The apparatus which we use in reproduction embodies certain features of my present invention. Separate reproducing systems are provided for each record, and each system includes a projector, a screen, and sound mechanism including a speaker adjacent to the screen of its reproducing system. The two systems are operated in synchronism.

The screens may be placed at different parts of the theatre with their speakers behind them and the projectors positioned so as to project the separate scenes on them. For example, I may have one screen upon the stage and another screen in a box of the theatre. An image of a person may be projected on each screen and these persons may be conversing with each other, as is done in some vaudeville acts.

The two projectors are relatively adjustable so that the pictures may be cast on different screens at different times. My invention further provides a light reflecting means by which the picture or the sight record may be cast on different screens without the necessity of moving the projectors.

I will now describe in detail the method and apparatus of my invention, reference being had to the accompanying drawing, in which:

Fig. 1 is a diagrammatic perspective view illustrating the apparatus for photographing and recording sound in a large set.

Fig. 2 is a fragmentary view of a pair of films on which sound and the scene shown in Fig. 1 have been recorded.

Fig. 3 is a diagrammatic view showing the reproducing of the picture or sight record and the sound record obtained in Fig. 1 and shown in the film of Fig. 2.

Fig. 4 is a perspective view showing the embodiment of my invention in which separate scenes of a single action or continuity are projected to various parts of the theatre.

Fig. 5 is a view illustrating the combination shown in Fig. 4 this combination utilizing a mirror means for reflecting one of the sight records to different parts of the theatre.

Referring in detail to the drawing, and particularly to Fig. 1, the numeral 11 represents a scene which may be quite large. Adapted to record the scene is a primary camera 12 and a secondary camera 13 synchronously operated by an operating means 14. The camera 12 is adapted to record the primary portion $x$ of the scene and the other camera 13 is adapted to record the secondary portion $y$ of the scene; in other words, each camera will record on a film therein one-half of the scene 11. My invention provides a sound recording means which includes recording primary and secondary systems 16 and 17. Each system 16 and 17 includes a microphone 18 placed adajacent the scene 11, an electrical circuit 19 and a recording device 20. For the purpose of simplicity and clarity the recording device 20 is shown separate from the cameras 12 or 13. It should be understood, however, in actual practice that these recording devices 20 may be embodied in the camera and print their record directly upon the edges of the film which is operated in the camera.

The microphones 18 of the two systems 16 and 17 are placed preferably on the opposite sides $x$ and $y$ of the scene so that one microphone will record the sounds on the side $x$ of the scene and the other microphone will record the sound on the side $y$ of the scene. If desired, more or less microphones may be used.

In recording the sound and sight the cameras 12 and 13 and the sound recording systems 16 and 17 are operated simultaneously.

The cameras 12 and 13 are shown as placed side by side. It should be understood that in some instances it will be desirable to place cameras one above the other so that the scene will be recorded from the viewpoints located in the same vertical plane.

In Fig. 2 I show portions of positive films 21 and 22. The film 21 has the portion $x$ of the scene 11 printed thereon and the film 22 has the portion $y$ of the scene printed thereon. The film 21 has a sound record 24, and the film 22 has a sound record 25 which corresponds to the records made with the sound recording systems 16 and 17.

In Fig. 3 the numeral 30 represents a screen on which the scene 11 is projected by means of primary and secondary projectors 31 and 32 synchronously operated by an operating means 33. The screen 30 is divided into primary and secondary parts $x$ and $y$, and the projectors 31 and 32 are adapted to project on to these two parts portions corresponding to the parts of the scene 11 represented by $x$ and $y$. The apparatus in Fig. 3 includes a primary sound reproducing system 34a and a secondary sound reproducing system 34. Each reproducing system includes a speaker 35 and an electrical system 36, which electrical systems are connected to a reproducing means 37 operated synchronously with the cameras 31 and 32. The sound reproducing means is only diagrammatically illustrated by the numeral 37, it being understood that it is usual practice to place the reproducing means in the projectors rather than in a separate device. The reproducing system 34a is adapted to reproduce sound recorded by the recording system 16, and the reproducing system 34 is adapted to record the sound produced by the recording system 17. It will, therefore, be seen that the sound created on the part $x$ of the scene 11 will be reproduced on the portion $x$ of the scene projected on the screen 30 and the sound produced by the portion $y$ of the scene 11 will be reproduced on the portion $y$ of the projected scene.

The form of my invention just described includes the important features of the invention. This form is adapted for taking the picture on an enlarged scale and reproducing it on an enlarged scale either with or without the sound effects, and I desire to make it clear that the invention resides in the photographing of a scene on two films regardless of whether or not the sound is used. It is, however, also a part of my invention to provide the sound recording and reproducing means by the use of which sound created at different parts of the scene will be reproduced at corresponding parts of the reproduced picture and thus more vividly reproduce the original scene. In large scenes and scenes which are reproduced on a large scale, it would be quite unsatisfactory to have all of the sound behind the screen radiate from a single source, because then the sound would not appear to come from the object creating the sound, but by placing the microphones and speakers in suitable positions the sounds can be made to correspond in position of the screen to the object which appears to be making the sound. My invention is not limited to a pair of microphones but may include any number as desired, used in combination with a film. The sound reproducing means does not require a plurality of films but may be used in conjunction with a single film upon which a complete scene is recorded.

It is necessary to operate the cameras 12 and 13 simultaneously and to reproduce both portions of the scene 11 simultaneously only when the action between the two parts overlaps. If action takes place only in one part of the scene, this part of the scene could be photographed at one time and the remaining part of the scene could be photographed at another time. Or, if individual activities are occuring in two separate parts of the scene the parts of the scene may be separately photographed and later synchronized for use in the projecting apparatus where synchronism is essential.

As I have pointed out in the statement of invention my invention is not limited to the recording of a single scene on two films but extends to the recording of two separate scenes on separate films, which scenes form a part of the same action or continuity.

Referring to Fig. 4, a screen 40 is placed on a stage 41 and a screen 42 is placed in a different part of the theatre such as in an upper box 43 thereof. In the operator's cage at the rear of the theatre are cameras 45 and 46 synchronously operated by a means 47. The camera 45 is adapted to project a scene on to the screen 40 and the camera 46 is adapted to project a scene on to the screen 42. Sound reproducing systems 49 and 50 are provided, the system 49 having a speaker 51 placed behind the screen 40 and the system 50 having a speaker 52 placed behind the screen 42. Each of the systems 49 and 50 have electric circuits 53 which connect to the sound reproducing means 54 operated synchronously with the projectors 45 and 46. The pictures or sight records projected on the screens 40 and 42 constitute separate scenes or they may constitute remote portions of the same scene. Considering, however, that they constitute separate scenes in the sense that they are not physically connected together by an intervening part of a scene the two scenes are connected together in action. For example, the action produced on the screens 40 and 42 may be a love scene from Romeo and Juliet. On the screen 40 we have an image of Romeo appealing to Juliet, who is shown in the scene projected on the screen 42. A dialogue may be carried on between the characters of the two scenes by reason of the positioning of the speakers 51 and 52 being placed behind the screens 40 and 42 where the sounds appear to originate.

If it was only necessary to cast the separate scenes on certain screens whose locations are fixed the projectors 45 and 46 may be rigidly positioned so that they will at all times be focused on the two screens. For the purpose of utility it may be desirable to project scenes to various parts of the theatre. Under such circumstances and to provide said utility it will be necessary to make the projectors 45 and 46 adjustable, so that they could be cast to screens located in different parts of the theatre.

In view of the fact that the principal use of the invention may be in the use of projecting two parts of the same scene on a different screen on the stage and due to the fact that some difficulty may be encountered in adjusting the cameras so that the two parts of the scene will be properly projected in juxtaposition on the screen, it may be desirable to rigidly fix the projectors 60 and 61 as shown in Fig. 5, so that they will project two parts of a single scene in proper position on the screen 62. My invention provides a reflecting means adapted to be used in connection with either camera so that the sight record or picture projected from either of the cameras may reflect to different screens in the theatre. I show this portion of my invention applied to the projector 61. It should be understood, however, that it may be applied to either or both projectors, as desired. This portion of the invention provides a mirror or reflector means 63 and a mirror or reflector 64. Light rays 65 passing from the projector 61 are reflected by the mirror 63, as indicated, to the mirror 64. The two mirrors 63 and 64 are adjusted so that the light rays may be reflected to a screen 67 on one side of the theatre or to a screen 68 on another side of the theatre. The details of construction of the reflecting means constitute another invention and will be protected in a separate application.

It will be seen that by using the reflector means of my invention the original setting of the projectors 60 and 61 will not be disturbed and they will therefore always be in position to cast two parts of a single scene upon the screen 62 without requiring the two projectors to be adjusted. When it is desired to cast the scene to one of the small screens 67 and 68 the reflecting means may be placed on either projector.

I claim as my invention:

1. An apparatus of the character described, including: means for projecting to separate screens a plurality of motion pictures, the action of one of said motion pictures being related to the action of another of said motion pictures, the two actions being necessary to the presentation of a complete motion picture sequence; and means adjacent the separate screens for reproducing the related sounds accompanying said actions.

2. An apparatus of the character described, including: means for projecting onto a primary screen a motion picture showing a part of the action of a story; means for projecting onto a second screen, separate from said primary screen, a motion picture showing a complementary part of said action, said motion pictures on said separate screens being of such related character that both contribute to the display of a complete motion picture drama; and sound reproducing means operatively connected to said projecting means for reproducing the individual sounds accompanying said motion pictures projected onto said screens.

3. An apparatus of the character described, including: means for projecting onto a primary screen a motion picture showing a part of the action of a story; means for projecting onto a second screen, separate from and at an angle to said primary screen, a motion picture showing a complementary part of said action, said motion pictures on said separate screens being of such related character that both contribute to the display of a complete motion picture drama; and sound reproducing means operatively connected to said projecting means for reproducing the sounds accompanying said motion pictures projected onto said screens.

4. An apparatus of the character described, including: means for projecting onto a primary screen a motion picture showing a part of the action of a story; means for projecting onto a second screen, separate from said primary screen, a motion picture showing a complementary part of said action, said motion pictures on said separate screens being of such related character that both contribute to the display of a complete motion picture drama; and sound reproducing apparatus adjacent each of said screens for rendering the sounds accompanying said separate parts of said action constituting said motion picture drama.

5. An apparatus of the character described, including: means for projecting onto a primary screen a motion picture showing a part of the action of a story; means for projecting onto a second screen, separate from and at an angle to said primary screen, a motion picture showing a complementary part of said action, said motion pictures on said separate screens being of such related character that both contribute to the display of a complete motion picture drama; and sound reproducing apparatus adjacent each of said screens for rendering the sounds accompanying said separate parts of said action constituting said motion picture drama.

6. An apparatus of the character described, including: means for projecting to separate screens a plurality of motion pictures, the action of one of said motion pictures being related to the action of another of said motion pictures, the two actions being necessary to the presentation of a complete motion picture sequence; and a plurality of sound reproducing means for separately reproducing sound to accompany the different actions projected by said projecting means.

VINCENT C. DE YBARRONDO.